July 29, 1958

R. C. BAKER 2,845,106

RESILIENT ECCENTRIC LOCK RING

Filed Nov. 30, 1953

INVENTOR.
Reuben C. Baker
BY

ATTORNEY

United States Patent Office 2,845,106
Patented July 29, 1958

2,845,106

RESILIENT ECCENTRIC LOCK RING

Reuben C. Baker, Coalinga, Calif., assignor to Baker Oil Tools, Inc., Los Angeles, Calif., a corporation of California Application November 30, 1953, Serial No. 395,003

1 Claim. (Cl. 151—19)

The present invention relates to devices for preventing relative turning between the male and female members of threaded joints.

Oil and gas well casing, and the like, is usually composed of a plurality of sections threadedly connected to each other, either directly or through the agency of an intervening coupling or collar. Ordinarily, a shoe is also threadedly attached to the lower end of the string of casing. To prevent inadvertent unscrewing of the shoe and some of the couplings, collars and casing sections, it has heretofore been the practice to weld the parts together after the threaded joints have been tightened. Some steels of which the casing and its associated fittings are made do not lend themselves to proper welding, or the heat associated with the welding operation reduces the strength of the parts and may also effect their distortion.

Accordingly, an object of the present invention is to provide an improved arrangement for locking companion threaded members to each other without the need for resorting to a welding operation.

Another object of the invention is to provide a thread lock device that is easily inserted in place after the threaded joint has been tightened, to preclude subsequent loosening of the joint and, for that matter, to prevent its further tightening as well, which in some situations might result in overstressing of the threads.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claim.

Referring to the drawings.

Figure 1:
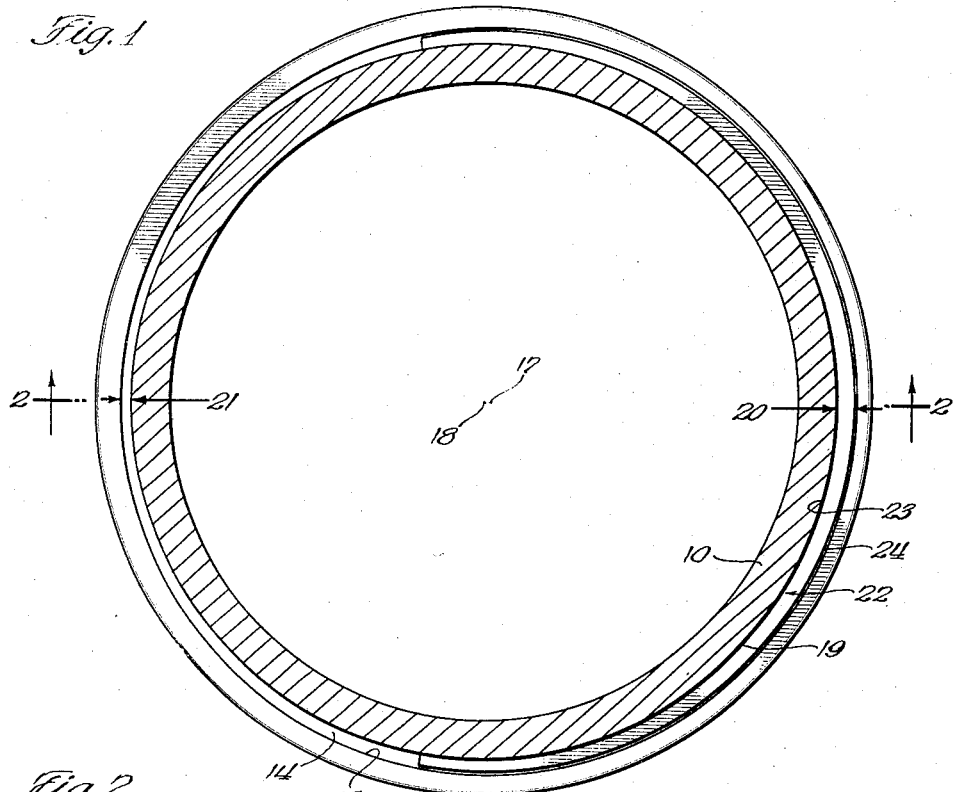
Figure 1 is a cross-section through the thread lock portion of the device.

In the form of invention disclosed in the drawings, a tubular member 10 has its end portion provided with external threads 11 that are threadedly secured to companion internal threads 12 formed in another tubular member 13. As disclosed, a tapered threaded joint 11, 13 is provided in which the male threaded member 10 is tightened to the desired degree within the female threaded member 13. The female threads 12 may be provided in the box portion of a casing shoe 13, or in a coupling or collar 13 for connecting casing sections together, or in another casing section 13 itself.

After the threaded joint has been tightened to the desired extent, its loosening or further tightening is prevented by means of the present invention. Thus, the female member 13 is provided with a counterbore 14 above or longitudinally to one side of the female threaded portion 12. The wall 15 of this counterbore is eccentric with respect to the common axis of the male and female threaded members 10, 13. The wall 15 of the counterbore 14, which extends to the end 16 of the female member, may be circular in cross-section, with its axis 17 displaced to one side of, or eccentric with respect to, the common axis 18 of the tubular members 10, 13 threadedly connected to one another. As a result, the annular space 14 between the periphery 19 of the male member 10 and the wall 15 of the counterbore is wider at one side 20 of the device than at the diametrically opposite side 21 of the device, this annular space gradually narrowing from its widest portion 20 to its narrowest portion 21, both in a clockwise and a counter-clockwise direction.

An eccentric ring segment 22 is disposable in the annular space 14 between the wall 15 of the counterbore and the periphery 19 of the male member. This ring segment 22 is made to conform to the annular space with a slight amount of clearance. Its inner wall 23 may lie on a circle substantially corresponding to the periphery 19 of the male member, whereas its external surface 24 may lie on the circle that conforms to the wall 15 of the counterbore, although having a slightly smaller radius of curvature to permit the ring to be inserted into the counterbore 14.

The ring segment 22 has an arcuate extent of a little more than 180 degrees, the ring tapering from its widest portion within the widest portion 20 of the annular space between the counterbore wall 15 and the periphery 19 of the tubular member toward the narrower portions of the annular space in both a clockwise and a counter-clockwise direction.

The ring 22 inherently tends to contract into snug gripping engagement with the periphery 19 of the tubular male member 10. To facilitate this gripping action, the inner surface 23 of the ring may be roughened or knurled, so that it tends to dig in, at least to a slight extent, and grip the periphery of the male member. The outer surface 24 of the ring segment has a slight clearance with the wall 15 of the counterbore, but only a comparatively small relative angular motion between the male and female tubular members 10, 13 is necessary to effect a wedging of the ring 22 within the eccentric annular space 14 and between the male and female members, as described hereinbelow. The relative angular motion to accomplish such wedging action can occur in either direction.

Figure 2:
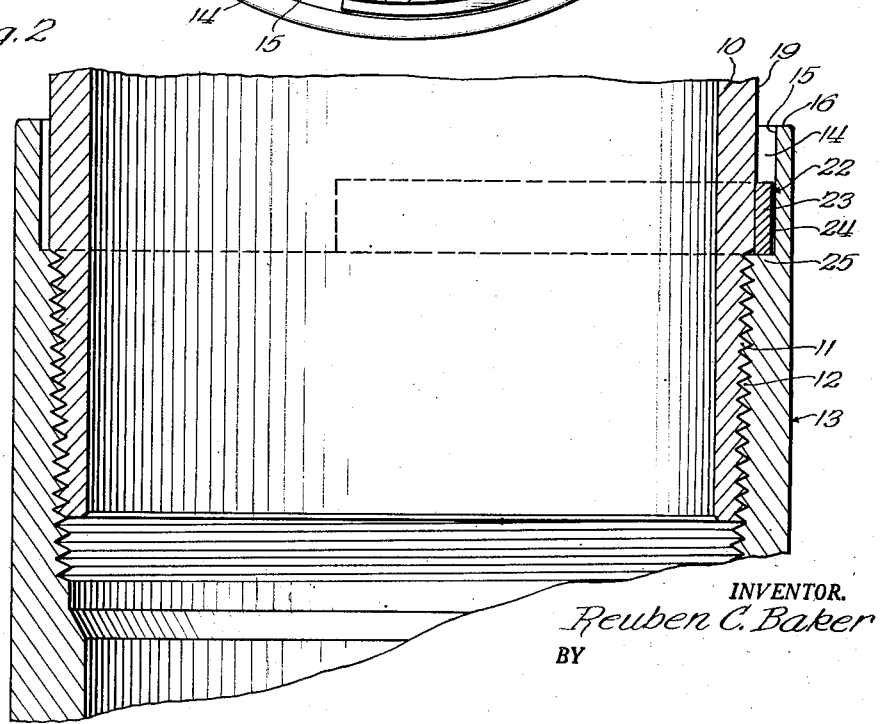
Fig. 2 is a longitudinal section taken along the line 2—2 of Fig. 1.

In the use of the threaded lock device, the male member 10 is threaded into the female member 13, and the threaded connection 11, 12 is tightened to the desired extent. The inherently contractible ring segment 22 is then spread apart sufficiently to enable it to be placed transversely over the male member 10 to one side of the end 16 of the female member 13, with its widest portion aligned with the widest portion 20 of the annular space 14. The ring segment is then moved longitudinally into the counterbore 14 until it engages the base 25 of the counterbore. The ring 22 may be released when disposed immediately above the end 16 of the female member 13. Through use of a suitable tool (not shown) it can then be moved longitudinally into the counterbore 14, the widest portion of the ring segment, of course, being disposed in the widest portion 20 of the annular counterbore space, and the tapering or convergent parts of the ring segments lying within and conforming to the corresponding tapering and convergent annular counterbore space. The tool may be used to move the ring segment 22 completely into the counterbore 14, as disclosed in Fig. 2.

In the event the tubular members 10, 13 tend to turn with respect to each other in a threaded joint loosening direction, the ring 22 will wedge between the periphery 19 of the male member and the wall 15 of the counterbore, to prevent such turning. As an example, assuming the threaded connection is right-hand, any tendency for the male member 10 to turn to the left, or counterclockwise, as disclosed in Fig. 1, with respect to the female member 13, will cause the male member to carry the ring 22 with it in the counter-clockwise direction, in view of the gripping action of the ring segment thereagainst, to merely a slight extent, which will move the exterior 24 of the ring segment into firm engagement with the eccentrically disposed wall 15 of the counterbore, wedging the ring segment between the wall of the counterbore and the periphery 19 of the tubular male member 10. In this manner, relative turning between the tubular male member 10 and the tubular female member 13 is prevented to forestall loosening of the threaded joint.

On the other hand, assuming that the members 10, 13 tend to turn with respect to each other in a thread tightening direction, the ring 22 will also preclude any material relative angular motion between the parts. As an example, assuming the threads 11, 12 of the joint are right-hand, the turning of the male member 10 in a right-hand or clockwise direction, as seen in Fig. 1, within the female member 13 will carry the ring 22 with the male member in such a clockwise direction, angularly shifting the ring 22 to a slight extent within the counterbore 14 and bringing the periphery 24 of the ring segment into wedging engagement with the wall 15 of the counterbore, thus locking the male member 10 to the female member 13 and precluding such relative tightening between the parts.

Although specific reference has been made to the turning of the male member in one direction or the other within the female member, the lock ring would be effective if the female member tended to be turned, inasmuch as a slight angular motion of the female member 13 with respect to the male member 10 and the ring segment 22 would bring the wall 15 of the counterbore into wedging engagement with the exterior 24 of the ring segment, further frictionally engaging the inner surface 23 of the ring segment with the periphery 19 of the male member, the ring member effectively locking the male and female members together, to preclude their relative rotation.

It is, accordingly, apparent that a thread lock has been provided which is easily inserted in place after the threaded joint has been fully tightened, to preclude loosening of the joint, as well as to prevent its further tightening. By virtue of the thread lock, it is unnecessary to weld the male and female parts 10, 13 together after the threaded joint has been tightened, to prevent its inadvertent loosening. Assurance is also had that the threads 11, 12 of the joint will not be overstressed, since the parts cannot be tightened inadvertently to a further extent after the lock ring segment 22 has been inserted in place within the counterbore 14.

The inventor claims:

In a threaded joint: a male member having an external thread received within an internal thread of a female member; said female member having a counterbore longitudinally to one side of its internal thread and extending to an end of said female member, said counterbore having a smooth inner wall surrounding said male member, the periphery of said male member within said counterbore and outwardly thereof being smooth, said wall being slightly eccentric with respect to the smooth periphery of said male member to provide an annular space between said wall and periphery that converges arcuately in opposite directions; and an expansible and contractible ring segment extending slightly more than 180 degrees and movable longitudinally into said counterbore and annular space from said end of said female member, after said external thread has been received within said internal thread, the inner surface of said segment being smooth and having a normal radius of curvature less than the radius of curvature of the smooth periphery of said male member when said segment is out of said space and unrestrained, said segment being expanded for lateral placement on the smooth periphery of said male member and location in said annular space and contracting therein so that the inner surface of said segment conforms to and grips the smooth periphery of said male member, the outer surface of said segment being smooth and conforming to the curvature of said counterbore wall when said segment is in said annular space, the inner and outer surfaces of said segment converging arcuately toward each other in opposite directions in conformance with the convergence of said annular space to be wedged between said wall and periphery of said male member and prevent relative arcuate motion between said members in both directions.

References Cited in the file of this patent

UNITED STATES PATENTS

| | | |
|---|---|---|
| 281,436 | Birch | July 17, 1883 |
| 1,328,399 | Reddy | Jan. 20, 1920 |
| 1,555,576 | Hokanson | Sept. 29, 1925 |
| 1,669,186 | Bunker | May 8, 1928 |
| 1,982,719 | Woerner | Dec. 4, 1934 |
| 1,999,706 | Spang | Apr. 30, 1935 |
| 2,318,590 | Boynton | May 11, 1943 |
| 2,382,948 | Brozek | Aug. 14, 1945 |